United States Patent
Yahagi

(10) Patent No.: US 12,393,769 B2
(45) Date of Patent: Aug. 19, 2025

(54) DATA GENERATION DEVICE

(71) Applicant: HONDA MOTOR CO., LTD., Tokyo (JP)

(72) Inventor: Koichi Yahagi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 283 days.

(21) Appl. No.: 18/123,354

(22) Filed: Mar. 20, 2023

(65) Prior Publication Data

US 2023/0306191 A1    Sep. 28, 2023

(30) Foreign Application Priority Data

Mar. 28, 2022 (JP) ................ 2022-051000

(51) Int. Cl.
| | |
|---|---|
| *G06F 40/166* | (2020.01) |
| *G10L 15/06* | (2013.01) |
| *G10L 15/22* | (2006.01) |
| *G10L 15/26* | (2006.01) |
| *G10L 15/30* | (2013.01) |

(52) U.S. Cl.
CPC .......... *G06F 40/166* (2020.01); *G10L 15/063* (2013.01); *G10L 15/22* (2013.01); *G10L 15/26* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 8,290,975 | B2* | 10/2012 | Gao | G06F 16/3322 |
| | | | | 707/750 |
| 11,132,389 | B2* | 9/2021 | Cho | G06F 16/313 |
| 2008/0300872 | A1* | 12/2008 | Basu | G06F 16/7844 |
| | | | | 704/235 |
| 2012/0117082 | A1* | 5/2012 | Koperda | G06F 16/24578 |
| | | | | 707/E17.084 |

(Continued)

FOREIGN PATENT DOCUMENTS

| | | |
|---|---|---|
| JP | 2005-222480 | 8/2005 |
| JP | 2006-238275 | 9/2006 |

(Continued)

OTHER PUBLICATIONS

Japanese Office Action for Japanese Patent Application No. 2022-051000 dated Mar. 5, 2024.

(Continued)

*Primary Examiner* — Jonathan C Kim
(74) *Attorney, Agent, or Firm* — Amin, Turocy & Watson, LLP

(57) ABSTRACT

A data generation device includes an acquisition unit for acquiring voice data of speech, a recognition unit for generating text data by performing voice recognition on the voice data, an extraction unit for extracting, as an extracted word, a word satisfying a predetermined condition, from among a plurality of words included in the text data, and a generation unit for generating summary data indicating a summary of content of the voice data, by using the extracted word and a word that is within a predetermined range from the extracted word, from among the plurality of words included in the text data.

4 Claims, 7 Drawing Sheets

(56) References Cited

U.S. PATENT DOCUMENTS

| | | | |
|---|---|---|---|
| 2012/0210203 A1* | 8/2012 | Kandekar | G06F 16/345 |
| | | | 715/230 |
| 2016/0275083 A1* | 9/2016 | Cho | G06F 16/313 |
| 2017/0124038 A1* | 5/2017 | Upadhyay | G06F 40/166 |
| 2017/0329845 A1* | 11/2017 | Epstein | G06F 16/9535 |
| 2017/0370739 A1* | 12/2017 | Liebinger | H04W 4/024 |
| 2023/0297765 A1* | 9/2023 | Vendrow | G10L 15/1815 |
| | | | 704/251 |
| 2023/0306191 A1* | 9/2023 | Yahagi | G10L 15/30 |
| 2024/0249068 A1* | 7/2024 | Aldred | G06F 16/345 |

FOREIGN PATENT DOCUMENTS

| | | |
|---|---|---|
| JP | 2019-121075 | 7/2019 |
| WO | 2010/103916 | 9/2010 |

OTHER PUBLICATIONS

Yamaguchi, et al. "Examination of the surface layer language and prosodic information in the abstract of lectures", edited in the eleventh annual meeting of the language processing society, pp. 173 to 176.

* cited by examiner

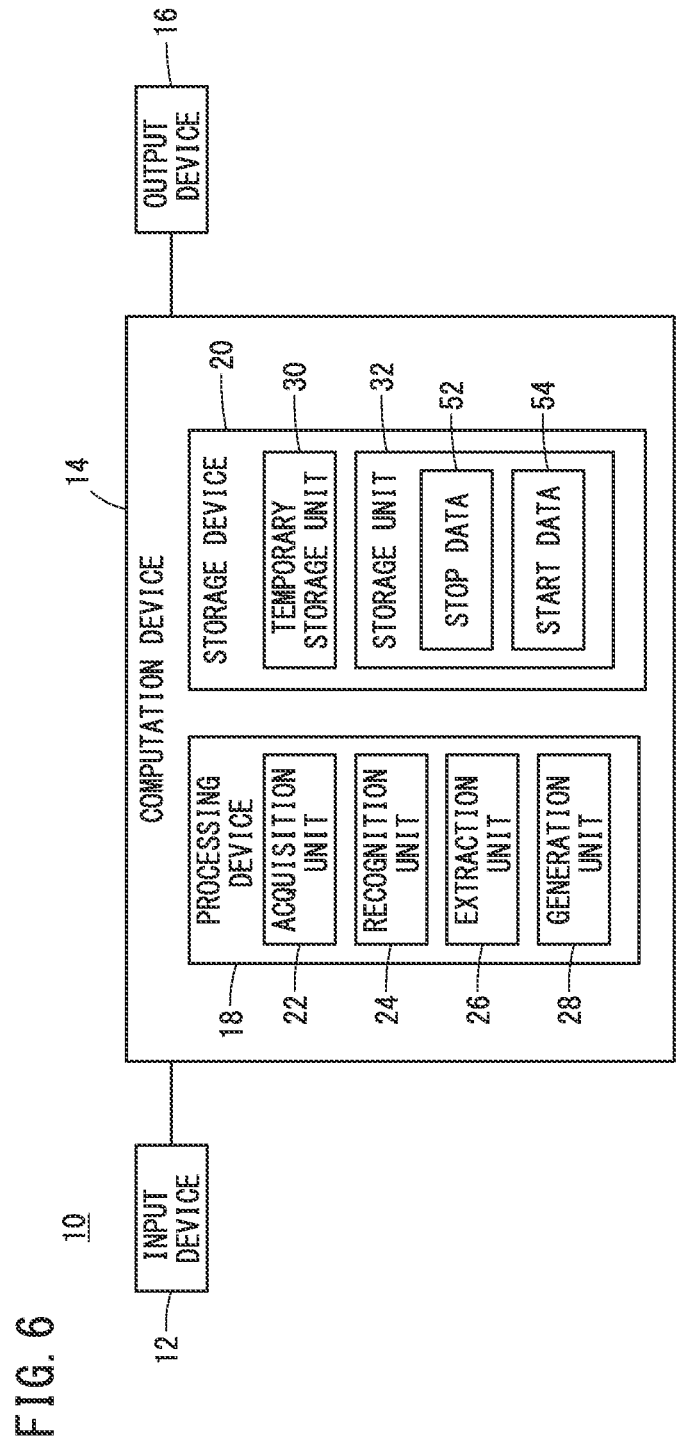

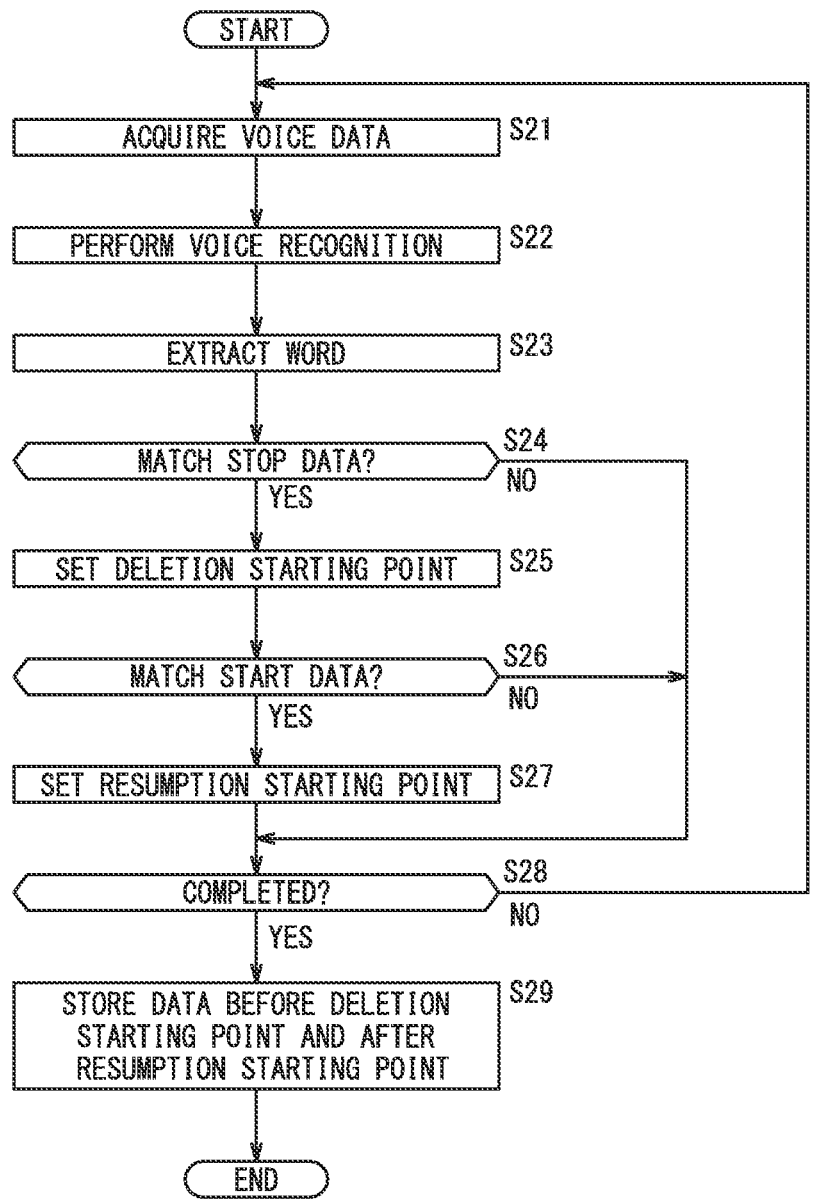

DATA GENERATION DEVICE

CROSS-REFERENCE TO RELATED APPLICATIONS

This application is based upon and claims the benefit of priority from Japanese Patent Application No. 2022-051000 filed on Mar. 28, 2022, the contents of which are incorporated herein by reference.

BACKGROUND OF THE INVENTION

Field of the Invention

The present invention relates to a data generation device for generating output data based on input data.

Description of the Related Art

JP 2019-121075 A discloses a technique for automatically generating a summary of a conference or meeting that is held verbally. In this technique, voice data is converted into text data by voice recognition, and text data to be included in the summary is selected by referring to a dictionary.

SUMMARY OF THE INVENTION

The content of the summary generated by the technique disclosed in JP 2019-121075 A depends on the dictionary used. For this reason, with the technique disclosed in JP 2019-121075 A, there is a high possibility that the summary reflecting the speech content cannot be generated.

An object of the present invention is to solve the above-mentioned problems.

According to an aspect of the present invention, there is provided a data generation device including: an acquisition unit configured to acquire voice data of speech; a recognition unit configured to generate text data by performing voice recognition on the voice data; an extraction unit configured to extract, as an extracted word, a word that satisfies a predetermined condition, from among a plurality of words included in the text data; and the generation unit configured to generate summary data indicating a summary of content of the voice data, by using the extracted word and a word that is within a predetermined range from the extracted word, from among the plurality of words included in the text data.

According to the present invention, it is possible to generate a summary reflecting the content of speech.

The above and other objects features and advantages of the present invention will become more apparent from the following description when taken in conjunction with the accompanying drawings in which preferred embodiments of the present invention is shown by way of illustrative example.

BRIEF DESCRIPTION OF THE DRAWINGS

FIG. 6 is a functional block diagram of a data generation device according to a first technology associated with the embodiments; and FIG. 7 is a flowchart of a data generation process according to the first technology associated therewith.

DETAILED DESCRIPTION OF THE INVENTION

1. First Embodiment

1-1. Configuration

Figure 1:
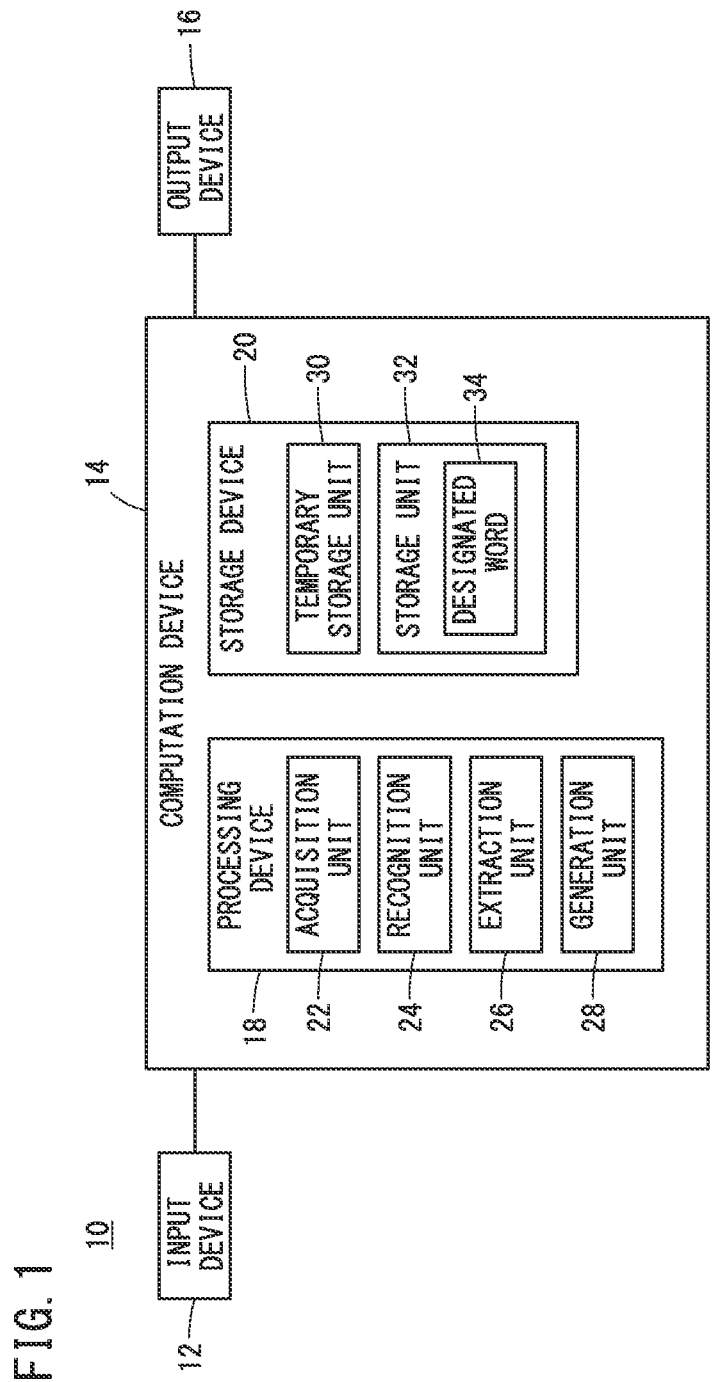
FIG. 1 is a functional block diagram of a data generation device according to a first embodiment.

FIG. 1 is a functional block diagram of a data generation device 10 according to a first embodiment. The data generation device 10 includes an input device 12, a computation device 14, and an output device 16.

The input device 12 includes various devices that input various data to the computation device 14. The input device 12 includes a microphone, a storage medium, and the like, for example. The microphone, the storage medium, and the like input voice data to the computation device 14. In addition, the input device 12 includes a keyboard, a mouse, a touch panel, or the like that inputs an instruction signal corresponding to an input operation of a user, to the computation device 14.

The computation device 14 is, for example, a computer. The computation device 14 includes a processing device 18 and a storage device 20.

The processing device 18 includes a processing circuit. The processing circuit may be a processor such as a CPU (central processing unit) or a GPU (graphics processing unit). The processing circuit may be an integrated circuit such as an ASIC (application specific integrated circuits) or an FPGA (Field Programmable Gate Array). The processor can execute various processes by executing a program stored in a storage unit 32. The processing device 18 functions as an acquisition unit 22, a recognition unit 24, an extraction unit 26, and a generation unit 28. At least a part of a plurality of processes may be executed by an electronic circuit including a discrete device.

The acquisition unit 22 acquires input data. The recognition unit 24 recognizes the input data acquired by the acquisition unit 22. The extraction unit 26 extracts a part of the recognition data recognized by the recognition unit 24. The generation unit 28 generates output data based on the extraction result of the extraction unit 26.

In the first embodiment, the acquisition unit 22 acquires voice data from the outside of the processing device 18. The recognition unit 24 generates text data by performing voice recognition on the voice data. The recognition unit 24 can use, for example, a known voice recognition technology. The extraction unit 26 extracts, as an extracted word, a word that satisfies a predetermined condition, from among a plurality of words included in the text data. The generation unit 28 generates summary data indicating a summary of the content of the input data by using the extracted word and a word that is within a predetermined range from the extracted word. The generation unit 28 can use, for example, a known text generation technology.

The storage device 20 includes a temporary storage unit 30 and a storage unit 32. The temporary storage unit 30 is, for example, a volatile memory. As examples of the volatile memory, there may be cited a RAM (Random Access Memory) or the like. The volatile memory is used as a working memory of the processor. The volatile memory temporarily stores data and the like necessary for processing or computation. The storage unit 32 is, for example, a non-volatile memory. As examples of the non-volatile memory, there may be cited a ROM (Read Only Memory), a flash memory, or the like. The non-volatile memory is used as a memory for storage. The non-volatile memory stores programs, tables, maps, and the like. For example, the non-volatile memory stores a program that causes the processing device 18 to function as artificial intelligence. At least a part of the storage unit 32 may be included in the processor, the integrated circuit, or the like as described above.

In the first embodiment, the storage unit 32 stores a designated word 34. The designated word 34 is a word that is highly likely to be used when a speaker summarizes the speech content (discussion content), a word that is highly likely to be used in the end of a speaker's speech (discussion), or the like. For example, the designated word 34 may be a word such as "summary" or "finally".

The output device 16 includes a device that outputs the summary data generated by the generation unit 28. The output device 16 includes, for example, a display, a speaker, etc.

1-2. Processing Details

Figure 2:
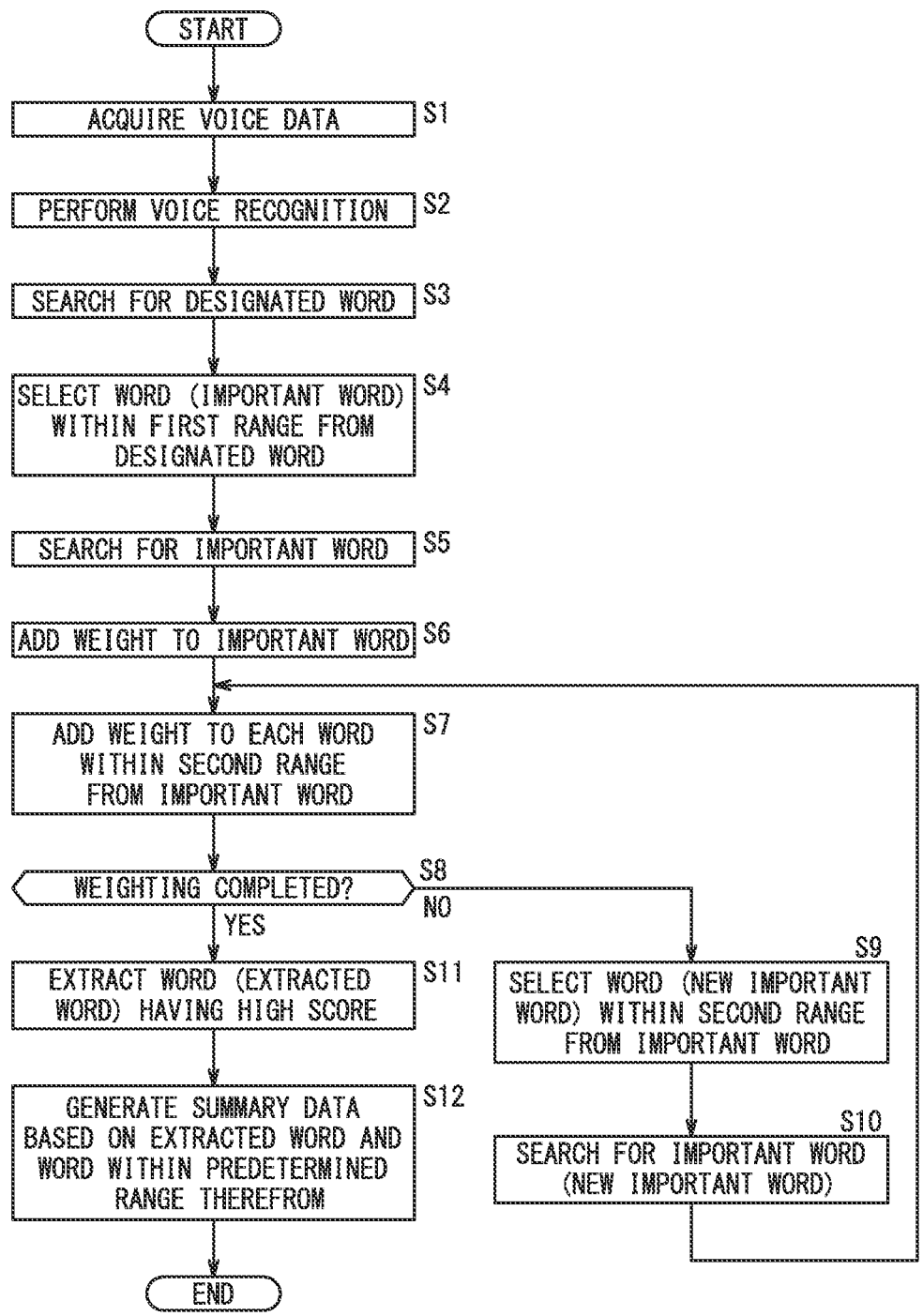
FIG. 2 is a flowchart of a data generation process according to the first embodiment.

FIG. 2 is a flowchart of a data generation process according to the first embodiment. For example, when a user operates the input device 12 such as the keyboard, the mouse, or the like, the input device 12 inputs a processing start signal to the computation device 14. The processing device 18 starts the data generation process shown in FIG. 2 by acquiring the processing start signal from the user.

In step S1, the acquisition unit 22 acquires voice data. For example, the storage device 20 may store the voice data acquired from the input device 12 (microphone, storage medium) in advance, and the acquisition unit 22 may acquire the voice data from the storage device 20. Alternatively, the acquisition unit 22 may acquire voice data directly from the input device 12 (storage medium). After completion of step S1, the process proceeds to step S2.

In step S2, the recognition unit 24 performs voice recognition on the voice data to generate text data. After completion of step S2, the process proceeds to step S3.

In step S3, the extraction unit 26 reads the designated word 34 from the storage unit 32. The extraction unit 26 searches for the designated word 34, from among all the words included in the text data. When a plurality of the designated words 34 are stored in the storage unit 32, the extraction unit 26 searches for each designated word 34 from among all the words included in the text data. After completion of step S3, the process proceeds to step S4.

In step S4, the extraction unit 26 selects, as an important word, each of words that are within a first range from the designated word 34. The extraction unit 26 does not select the designated word 34 as the important word. The first range is optionally set. For example, the first range may be a range from the beginning to the end of a sentence including the designated word 34. Alternatively, the first range may be a range from the designated word 34 to the end of a sentence including that designated word 34. Alternatively, the first range may be set based on the number of words (N or the like) before and after the designated word 34, for example. Further, the word selected by the extraction unit 26 may be, for example, a word belonging to a specific part of speech, such as a noun. After completion of step S4, the process proceeds to step S5.

In step S5, the extraction unit 26 searches for the important word from among all the words included in the text. After completion of step S5, the process proceeds to step S6.

In step S6, the extraction unit 26 adds weight to the retrieved important word. The weight is optionally set. In addition, the weight may be points or a multiplying factor. After completion of step S6, the process proceeds to step S7.

In step S7, the extraction unit 26 adds weight to each of words that are within a second range from the important word, from among all the words included in the text data. The second range is optionally set, similarly to the first range. The second range may be the same as or different from the first range. Furthermore, the word to which the weight is added by the extraction unit 26 may be, for example, a word that belongs to a specific part of speech, for example, such as a noun. The weight is optionally set. In addition, the weight may be points or a multiplying factor. When adding the weight to the same word multiple times, the extraction unit 26 may set the numerical value of the weight added to the same word to be the same, regardless of the number of times the weight is added to the same word. Alternatively, the extraction unit 26 may increase the numerical value of the weight added to the same word each time the weight is added to the same word. After completion of step S7, the process proceeds to step S8.

In step S8, the extraction unit 26 determines whether or not the process for adding the weight (weighting process) has been completed. In the present embodiment, the user can set the number of executions of the weighting process. When the weighting process is completed (step S8: YES), the process proceeds to step S11. On the other hand, when the weighting process is not completed (step S8: NO), the process proceeds to step S9.

When the process shifts from step S8 to step S9, the extraction unit 26 selects, as a new important word, each word that is within the second range from the important word. The extraction unit 26 does not select the important word that has already been selected, as a new important word. A range other than the second range may be set. Further, the word selected by the extraction unit 26 may be, for example, a word belonging to a specific part of speech, such as a noun. After completion of step S9, the process proceeds to step S10.

In step S10, the extraction unit 26 retrieves the important word (new important word) from all the words included in the text. After completion of step S10, the process returns to step S7.

When the process proceeds from step S8 to step S11, the extraction unit 26 extracts a word having a high score, as an extracted word. When the weight is points, the extraction unit 26 calculates a total value of the points. When the weight is a multiplying factor, an initial value of each word is predetermined. The extraction unit 26 calculates a score for each word by multiplying the initial value by the multiplying factor of the added weight. The extraction unit 26 may extract a word having a score equal to or greater than a predetermined threshold value, as an extracted word. Alternatively, the extraction unit 26 may calculate an average value of the scores of the words and extract a word having a score equal to or greater than the average value, as the extracted word. After completion of step S11, the process proceeds to step S12.

In step S12, the generation unit 28 selects one or more words that are within a predetermined range from the extracted word, from among all the words included in the text data. The predetermined range is optionally set. For example, the predetermined range may be a range from the beginning to the end of the sentence that includes the extracted word. Alternatively, the predetermined range may be a range from the extracted word to the end of the sentence including that extracted word. Alternatively, the predetermined range may be set based on the number of words (N or the like) before and after the extracted word. The predetermined range may include the extracted word or may not include the extracted word. Further, the selected word may be, for example, a word belonging to a specific part of speech, such as a noun. The generation unit 28 generates summary data by using the selected words.

1-3. Specific Example

Figure 3:
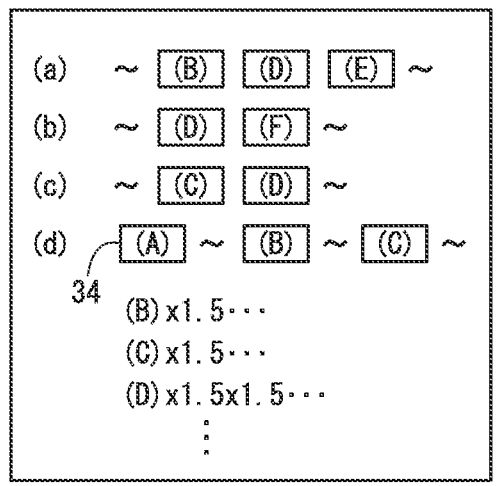
FIG. 3 is a diagram for explaining a specific example of the first embodiment.

Here, a specific example of the process performed by the extraction unit 26 will be described. FIG. 3 is a diagram for explaining a specific example of the first embodiment. FIG. 3 illustrates Sentences (a) to (d) included in the text data and Words (A) to (F) included in Sentences (a) to (d). In this example, it is assumed that the designated word 34 is Word (A). In addition, the first range is a "range from the concerned word (e.g., the designated word 34 or the important word) to the end of the sentence". It is also assumed that the second range is "one word coming after the concerned word".

Sentence (d) includes Word (A), which is the designated word 34. The extraction unit 26 selects Word (B) and Word (C), which are within the first range from Word (A), as the important words. The extraction unit 26 adds weight (multiplying factor: 1.5) to Word (B) and Word (C) which are the important words. Sentence (a) includes Word (B), which is one of the important words. Further, Sentence (c) includes Word (C), which is another of the important words. The extraction unit 26 adds weight (multiplying factor: 1.5) to Word (D), which is within the second range from Word (B). Furthermore, the extraction unit 26 adds weight (multiplying factor: 1.5) to Word (D), which is within the second range from Word (C). That is, Word (D) is weighted twice.

In Sentence (a), the extraction unit 26 selects, as a new important word, Word (D) which is within the second range from Word (B) being one of the important words. In addition, in Sentence (c), the extraction unit 26 selects, as a new important word, Word (D) which is within the second range from Word (C) which is another important word. However, in Sentence (a), Word (D) has already been set as a new important word. The extraction unit 26 executes the above-described process the number of times set by the user. In this way, weight is assigned to each word.

In the first embodiment, a second designated word that causes addition of a negative weight may be set. The extraction unit 26 may add such a negative weight to the second designated word and a word that is within a predetermined range of the second designated word. Alternatively, the extraction unit 26 may delete a sentence including the second designated word, from the text data.

2. Second Embodiment

Figure 4:
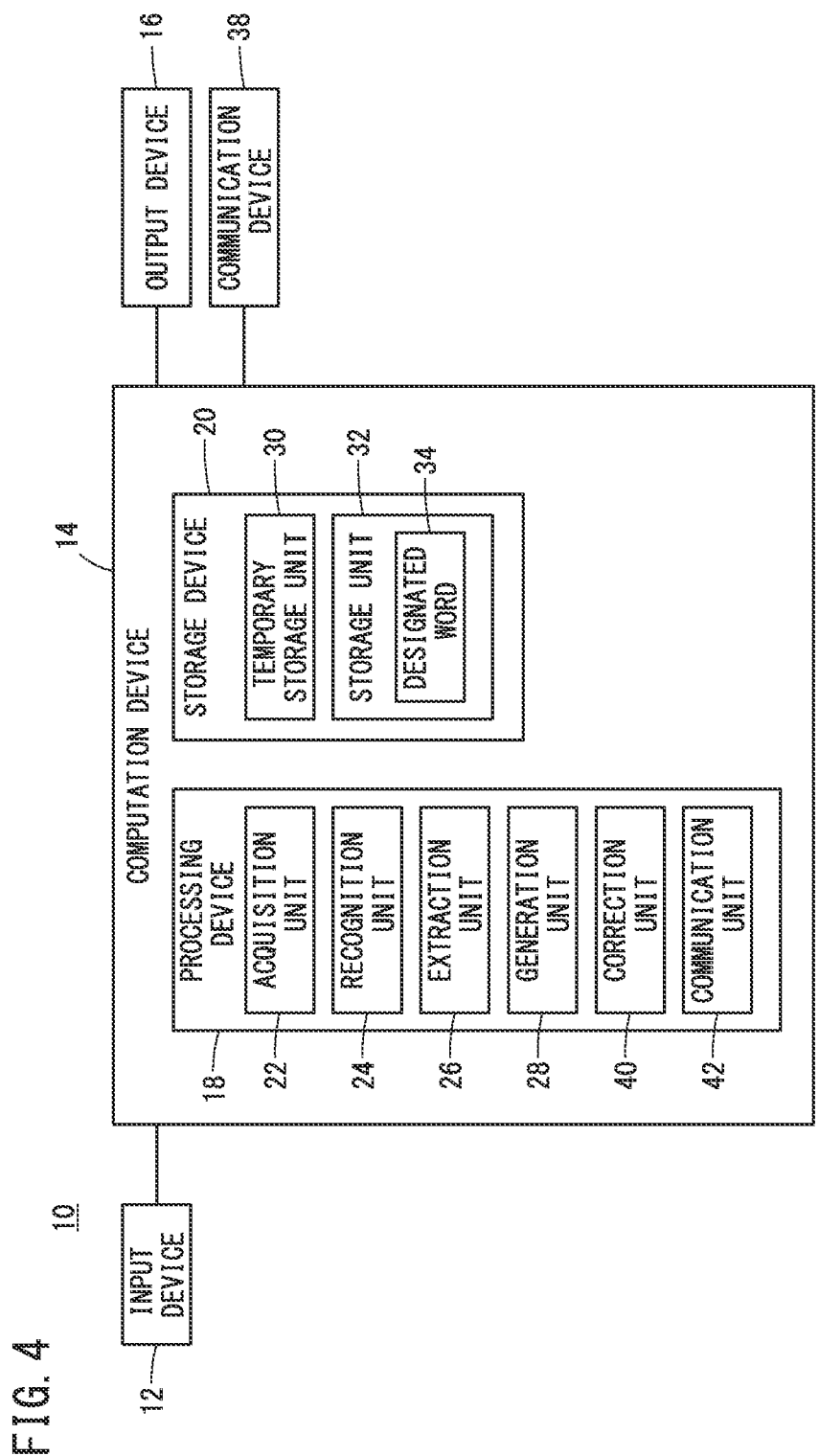
FIG. 4 is a functional block diagram of the data generation device according to a second embodiment.
Figure 5:
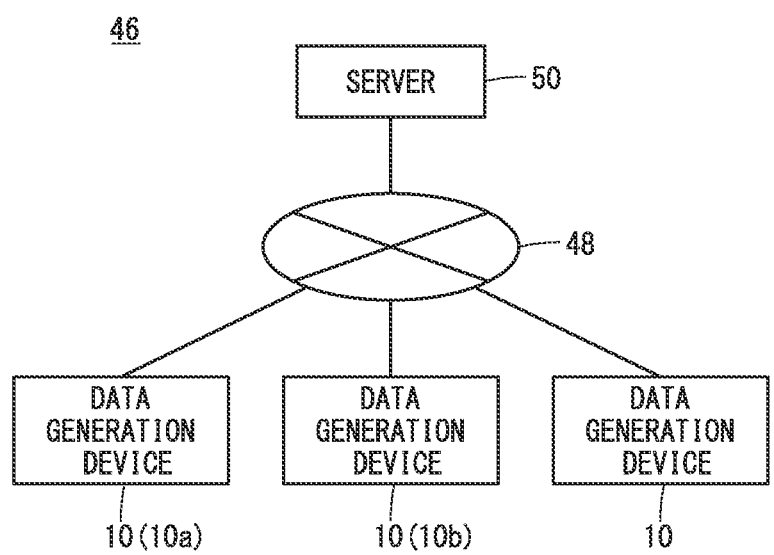
FIG. 5 is a configuration diagram of a data generation system according to the second embodiment.

FIG. 4 is a functional block diagram of a data generation device 10 according to a second embodiment. FIG. 5 is a configuration diagram of a data generation system 46 according to the second embodiment. In the second embodiment, the same components as those in the first embodiment are denoted by the same reference numerals, and description thereof will be omitted.

In the second embodiment, the data generation device 10 includes an input device 12, a computation device 14, an output device 16, and a communication device 38. The communication device 38 is a modem, a router, an optical network unit, or the like. The computation device 14 is connected to a network 48 via the communication device 38.

In the second embodiment, the processing device 18 also functions as a correction unit 40 and a communication unit 42 in addition to the acquisition unit 22, the recognition unit 24, the extraction unit 26, and the generation unit 28. The correction unit 40 corrects the summary data stored in the storage unit 32 using correction data acquired from the keyboard or the like (the input device 12). The communication unit 42 can transmit the summary data to an external server 50 via the communication device 38 and the network 48. The communication unit 42 can also receive summary data from the external server 50 via the communication device 38 and the network 48.

As shown in FIG. 5, the data generation system 46 includes the network 48, the server 50, and a plurality of the data generation devices 10. The server 50 and each of the data generation devices 10 are connected to each other via the network 48. The data generation device 10 can transmit the summary data to the server 50. The data generation device 10 can receive summary data from the server 50.

In the second embodiment, the user can correct the summary data generated by the generation unit 28. For example, the user causes the display device (output device 16) to display the summary data. The user inputs the correction data using the keyboard or the like (input device 12). The correction unit 40 corrects the summary data according to the correction data. The correction unit 40 causes the corrected summary data to be stored in the storage unit 32. The generation unit 28 performs supervised learning by using the summary data whose data have been corrected.

In the second embodiment, the user can request another user to correct the summary data generated by the generation unit 28. For example, the communication unit 42 of the data generation device 10a transmits a correction request to the server 50 together with the summary data, in response to an operation performed by a first user. The communication unit 42 of the data generation device 10b receives the summary data uploaded to the server 50. A second user of the data generation device 10b corrects the summary data. The communication unit 42 of the data generation device 10b transmits the corrected summary data to the server 50, in response to an operation performed by the second user. The communication unit 42 of the data generation device 10a receives the corrected summary data which has been uploaded to the server 50, in response to an operation performed by the first user. The communication unit 42 of the data generation device 10a causes the corrected summary data to be stored in the storage unit 32. The generation unit 28 of the data generation device 10a performs supervised learning by using the summary data whose data have been corrected. In addition, the generation unit 28 of the data generation device 10a may acquire a correction result and a learning result of another data generation device 10 (for example, the data generation device 10b) and thereby perform machine learning. Furthermore, the generation unit 28 of the data generation device 10a may be configured to be able to individually use the learning result of the data generation device 10a and the learning result of another data generation device 10.

3. First Technology Associated with Embodiments

3-1. Configuration

FIG. 6 is a functional block diagram of a data generation device 10 according to a first technology associated with the embodiments, which will hereinafter be simply referred to as a first associated technology. In the first associated technology, the same components as those of the first embodiment are denoted by the same reference numerals, and description thereof will be omitted.

In the first associated technology, the recognition unit 24 generates text data (recognition data) by performing voice recognition on voice data in order of acquisition of the voice data. The recognition unit 24 can use, for example, a known voice recognition technology. The extraction unit 26 extracts the text data in chronological order. The generation unit 28 compares the text data extracted by the extraction unit 26 with predetermined data (stop data 52 and start data 54) in chronological order. When it is determined that the text data and the predetermined data match each other, the generation unit 28 sets a time point a predetermined time before the time of the determination having been made, as a starting point (a deletion starting point, a resumption starting point). The generation unit 28 refers to the set starting point and processes the voice data temporarily stored in the temporary storage unit 30 to generate new output data. The generation unit 28 stores the output data in the storage unit 32.

In the first associated technology, the storage unit 32 stores the stop data 52 and the start data 54. The stop data 52 is a word, a phrase, or the like that is highly likely to be used by a speaker in a situation where the speaker has a confidential talk. For example, the stop data 52 may include a phrase such as "it is confidential, but". The start data 54 is a word, phrase, or the like that is likely to be used by the speaker in a situation of ending the confidential talk. For example, the start data 54 may include a phrase such as "I cannot speak anymore".

3-2. Processing Details

FIG. 7 is a flowchart of a data generation process according to the first associated technology. For example, when a user operates the input device 12 such as the keyboard, the mouse, or the like, the input device 12 inputs a processing start signal to the computation device 14. The processing device 18 starts the data generation process shown in FIG. 2 by acquiring the processing start signal from the user. In the process of the first associated technology, after the voice data acquisition (step S21), the processing subsequent to the voice recognition (step S22) is immediately performed.

In step S21, the acquisition unit 22 acquires voice data. For example, the acquisition unit 22 acquires voice data from the input device 12 (microphone) and temporarily stores the voice data in the temporary storage unit 30. The acquisition unit 22 affixes the acquisition time to the voice data using the system clock. After completion of step S21, the process proceeds to step S22.

In step S22, the recognition unit 24 performs voice recognition on the voice data temporarily stored in the temporary storage unit 30 to generate text data. After completion of step S22, the process proceeds to step S23.

In step S23, the extraction unit 26 extracts words from the text data in chronological order. After completion of step S23, the process proceeds to step S24.

In step S24, the extraction unit 26 compares the extracted words with the stop data 52. If the extracted word matches the stop data 52 (step S24: YES), the process proceeds to step S25. On the other hand, when the extracted word does not match the stop data 52 (step S24: NO), the process proceeds to step S28.

When the process proceeds from step S24 to step S25, the extraction unit 26 sets a time point a first predetermined time before the determination time point of step S24, as the time of the deletion starting point. The first predetermined time is stored in the storage unit 32 in advance. As the first predetermined time, a time required for the recognition unit 24 and the extraction unit 26 to perform the processing from step S22 to step S24 is set. After completion of step S25, the process proceeds to step S26.

In step S26, the extraction unit 26 compares the extracted words with the start data 54. If the extracted word matches the start data 54 (step S26: YES), the process proceeds to step S27. On the other hand, when the extracted word does not match the start data 54 (step S26: NO), the process proceeds to step S28.

When the process proceeds from step S26 to step S27, the extraction unit 26 sets a time point a second predetermined time before the determination time point of step S26, as the time of the resumption starting point. The second predetermined time is stored in the storage unit 32 in advance. As the second predetermined time, a time required for the recognition unit 24 and the extraction unit 26 to perform the processing from step S22 to step S26 is set. After completion of step S27, the process proceeds to step S28.

When the process proceeds from step S24 or step S26 to step S28, the acquisition unit 22 determines whether or not the voice data acquisition has been completed. When the acquisition of the voice data is completed (step S28: YES), the process proceeds to step S29. On the other hand, if the acquisition of the voice data has not yet been completed (step S28: NO), the process returns to step S21.

When the process proceeds from step S28 to step S29, the generation unit 28 causes the voice data temporarily stored in the temporary storage unit 30 to be stored in the storage unit 32. Here, the generation unit 28 generates voice data excluding data acquired from the time of the deletion starting point to the time of the resumption starting point, and stores the generated voice data in the storage unit 32, as output data.

The stop data 52 may not be a word or a phrase, but may be a sound volume or an intonation of a voice.

4. Second Technology Associated with Embodiments

In the first associated technology, the acquisition unit 22 acquires voice data as input data. On the other hand, in a second technology associated with the embodiments (which will hereinafter be simply referred to as a second associated technology), the acquisition unit 22 may acquire voice data and image data, as input data.

In the second associated technology, the input device 12 includes, for example, a camera that inputs image data to the computation device 14, a storage medium, and the like. The image of the speaker is captured.

The recognition unit 24 of the processing device 18 performs image recognition. The recognition unit 24 recognizes the motion of the speaker by performing image recognition on the image data. The recognition unit 24 can use, for example, a known image recognition technology.

The extraction unit 26 of the processing device 18 compares the motion of the speaker with predetermined stop data 52 and predetermined start data 54, and sets the deletion starting point and the resumption starting point. The stop data 52 in this case is data indicating a motion that the speaker is highly likely to make in a situation in which the speaker has a confidential talk. For example, the stop data 52 may include acting like whispering in someone's ear, or the like. On the other hand, the start data 54 in this case is data indicating a motion that the speaker is highly likely to make in a situation where the speaker stops the confidential talk. For example, the start data 54 may include an action of lowering the arm from the whispering position, or the like.

Similarly to the first associated technology, the generation unit 28 of the processing device 18 causes the storage unit 32 to store the voice data as output data. Furthermore, the generation unit 28 removes image data acquired from the time of the deletion starting point to the time of the resumption starting point, from the image data temporarily stored in the temporary storage unit 30. Furthermore, the generation unit 28 stores the remaining image data in the storage unit 32 as output data. Furthermore, the generation unit 28 may cause the storage unit 32 to store the image data acquired from the time of the deletion starting point to the time of the resumption starting point, as important data.

5. Others

It is also possible to combine the first embodiment or the second embodiment with the first associated technology or the second associated technology. For example, in a combination of the first embodiment and the first associated technology, the output data generated by the first associated technology can be used as the input data of the first embodiment.

6. Invention Obtained from Embodiments

The invention that can be grasped from the above embodiments will be described below.

The data generation device (10) according to an aspect of the present invention includes: the acquisition unit (22) configured to acquire voice data of speech; the recognition unit (24) configured to generate text data by performing voice recognition on the voice data; the extraction unit (26) configured to extract, as the extracted word, a word that satisfies a predetermined condition, from among the plurality of words included in the text data; and the generation unit (28) configured to generate summary data indicating a summary of content of the voice data, by using the extracted word and a word that is within a predetermined range from the extracted word, from among the plurality of words included in the text data.

With the above configuration, since the word satisfying the predetermined condition is extracted and the output data is generated by using the words around the extracted word, it is possible to generate the summary reflecting the speech content.

In the above aspect, the extraction unit (26) may select, as an important word, at least one word that is within a first range from a predetermined designated word (34), from among the plurality of words included in the text data, add a predetermined weight to each of the important word and at least one word that is within a second range from the important word, among the plurality of words included in the text data, and determine the extracted word to be extracted, based on the weight added to each of the words.

With the above configuration, since an appropriate weight is added to each word and the extracted word is determined based on the weight, it is possible to generate a summary that more appropriately reflects the speech content.

In the above aspect, the extraction unit (26) may select, as a new important word, the at least one word that is within the second range from the important word, from among the plurality of words included in the text data, and add the weight to at least one word that is within the second range from the new important word, among the plurality of words included in the text data.

With the above configuration, since an appropriate weight is added to each word and the extracted word is determined based on the weight, it is possible to generate a summary that more appropriately reflects the speech content.

In the above aspect, the extraction unit (26) may increase the numerical value of the weight added to the same word each time the weight is added to the same word.

With the above configuration, since the weight of each word is appropriately changed, it is possible to generate a summary that more appropriately reflects the content of the speech.

In the above aspect, when the summary data is corrected by the user, the generation unit (28) may perform machine learning, based on the corrected summary data.

With the above configuration, it is possible to generate a summary in accordance with the preference of a specific user.

The data generation device (10) according to the above aspect may further include a communication unit (42) capable of transmitting the summary data to an external server and receiving the corrected summary data from the external server, and the generation unit (28) may perform machine learning based on the corrected summary data acquired via the communication unit (42).

With the above configuration, it is possible to generate a general summary.

The data generation device (10) according to the technology associated with the present invention may further include the temporary storage unit (30) that temporarily stores the input data acquired by the acquisition unit (22), and the storage unit (32) that stores the output data generated by the generation unit (28). The acquisition unit (22) may acquire, as the input data, at least one of the voice data or the image data. The recognition unit (24) may recognize the input data in order of acquisition of the input data. The extraction unit (26) may extract the recognition data recognized by the recognition unit (24), in chronological order. When comparing the recognition data extracted by the extraction unit (26) with predetermined stop data (52) in chronological order and then determining that they match each other, the generation unit (28) may set a time point a predetermined time before the determination time point, as a deletion starting point, and store the input data that were temporarily stored in the temporary storage unit (30) before the deletion starting point, in the storage unit (32), as the output data.

With the above associated technology, it is possible to prevent inappropriate data from being stored.

In the above associated technology, after the deletion starting point has been set, when comparing the recognition data extracted by the extraction unit (26) with predetermined start data (54) in chronological order and then determining that the recognition data and the start data match each other, the generation unit (28) may set, as a resumption starting point, a time point a predetermined time before the determination time point and store, as the output data, the input data that were temporarily stored in the temporary storage unit (30) after the resumption starting point, in the storage unit (32).

With the above associated technology, it is possible to prevent inappropriate data from being stored and to store appropriate data acquired after the inappropriate data.

In the associated technology, the acquisition unit (22) may acquire the voice data as the input data, and the stop data (52) may be a word or a phrase.

In the associated technology, the acquisition unit (22) may acquire the image data as the input data, and the stop data (52) may be a predetermined motion of a user.

In the associated technology, the acquisition unit (22) may acquire the voice data as the input data, and the stop data (52) may be a sound volume or an intonation.

The present invention is not limited to the above disclosure, and various modifications are possible without departing from the essence and gist of the present invention.

What is claimed is:

1. A data generation device comprising one or more processors that execute computer-executable instructions stored in a memory, wherein the one or more processors execute the computer-executable instructions to cause the data generation device to:
acquire voice data of speech;
temporarily storing the voice data in a temporary storage unit;
generate text data by performing voice recognition on the voice data stored in the temporary storage unit;
extract, as an extracted word, a word that satisfies a predetermined condition, from among a plurality of words included in the text data; and
generate summary data indicating a summary of content of the voice data, by using the extracted word and a word that is within a predetermined range from the extracted word, from among the plurality of words included in the text data;
after the summary data is generated, causing the voice data temporarily stored in the temporary storage unit to be stored in a storage unit as output data, and
presenting the summary data to a user as the output data,
wherein the one or more processors cause the data generation device to:
select, as an important word, at least one word that is within a first range from a predetermined designated word, from among the plurality of words included in the text data;
add a predetermined weight to each of the important word and at least one word that is within a second range from the important word, among the plurality of words included in the text data; and
determine the extracted word to be extracted, based on the weight added to each of the important word and the at least one word that is within the second range from the important word, and
wherein the one or more processors cause the data generation device to:
select, as a new important word, the at least one word that is within the second range from the important word, from among the plurality of words included in the text data; and
add the weight to at least one word that is within the second range from the new important word, among the plurality of words included in the text data.

2. The data generation device according to claim 1, wherein
the one or more processors cause the data generation device to:
increase a numerical value of the weight added to a same word each time the weight is added to the same word.

3. The data generation device according to claim 1, wherein
the one or more processors cause the data generation device to:
when the summary data is corrected by a user, perform machine learning, based on the corrected summary data.

4. The data generation device according to claim 1, wherein
the one or more processors cause the data generation device to:
transmit the summary data to an external server;
receive corrected summary data from the external server; and
perform machine learning, based on the corrected summary data acquired from the external server.

* * * * *